A. BOWSER.
APPARATUS FOR HANDLING LIQUIDS.
APPLICATION FILED MAR. 2, 1910.
1,051,365.
Patented Jan. 21, 1913.
2 SHEETS—SHEET 1.
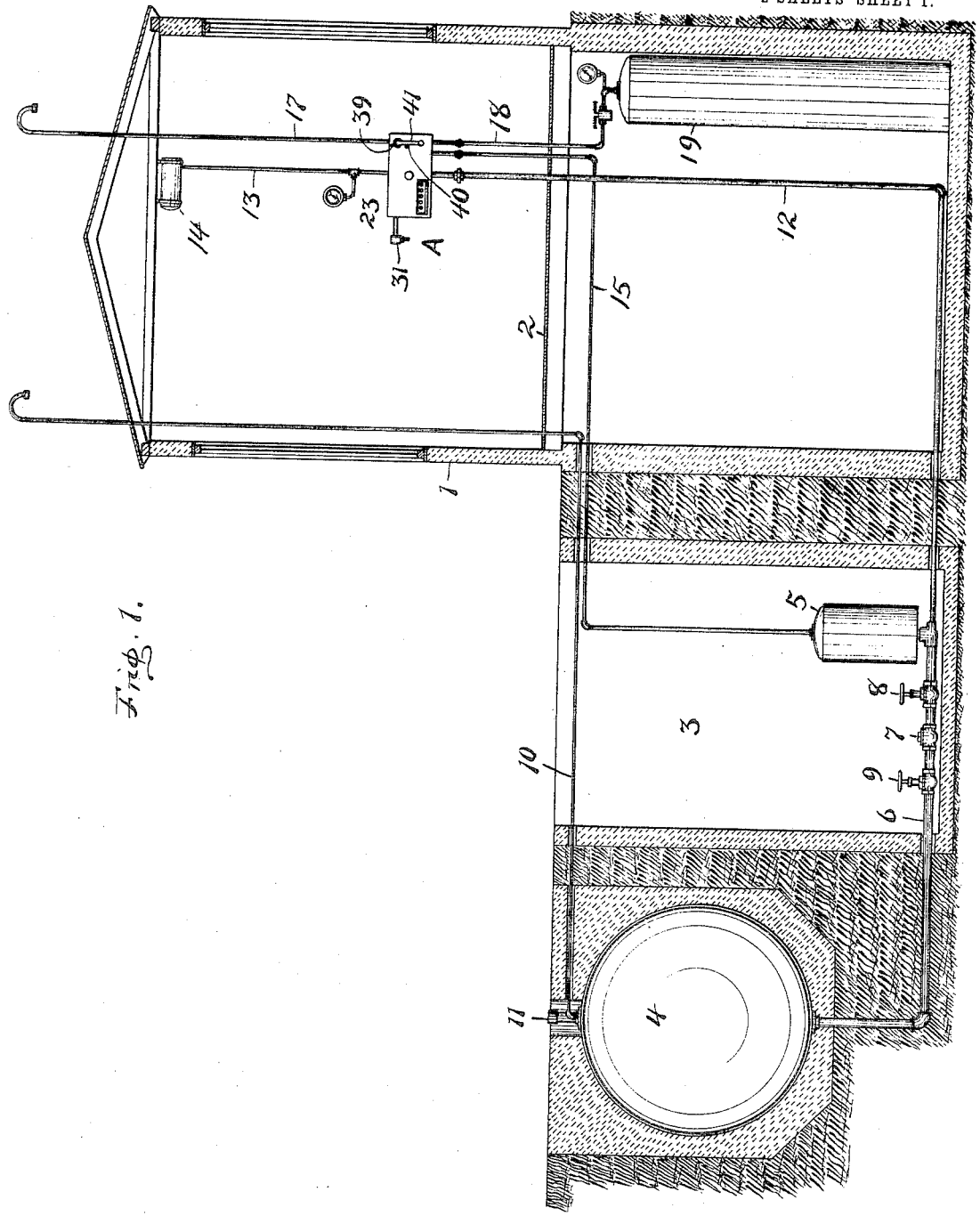
WITNESSES:
J. W. Dickens
Robert Burns.
Augustus Bowser INVENTOR:
BY H. G. Burns
ATTORNEY.

A. BOWSER.
APPARATUS FOR HANDLING LIQUIDS.
APPLICATION FILED MAR. 2, 1910.
1,051,365.
Patented Jan. 21, 1913.
2 SHEETS—SHEET 2.
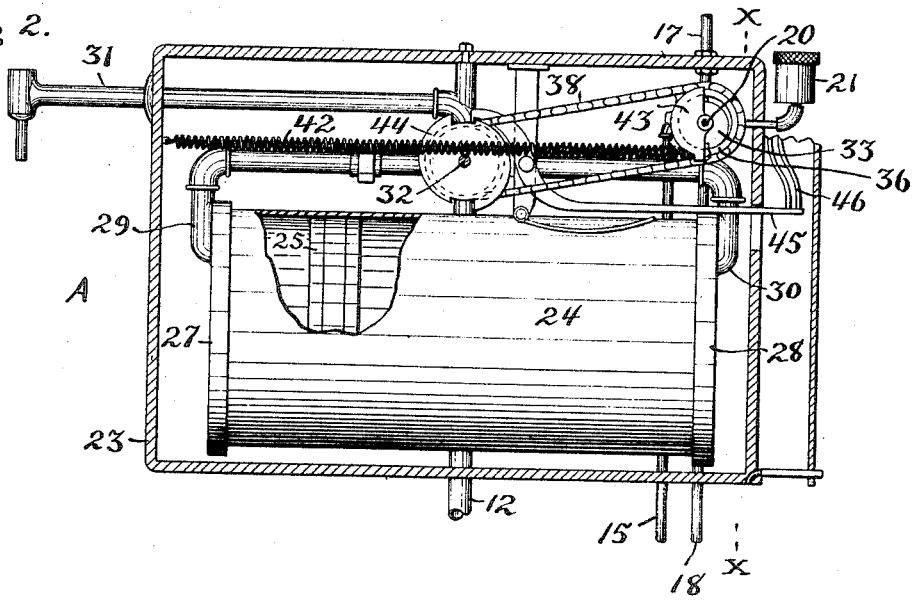
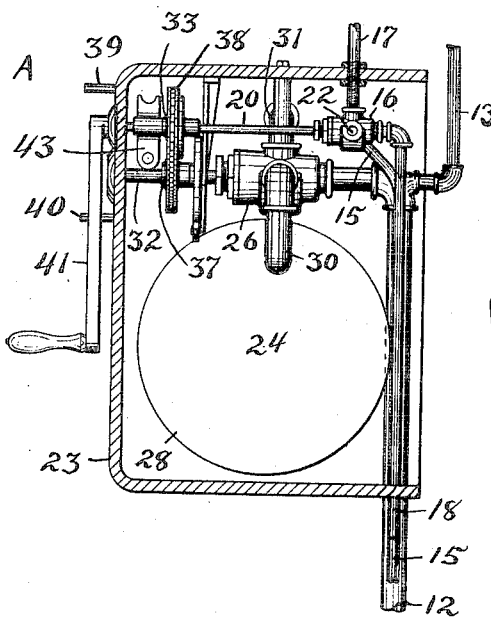
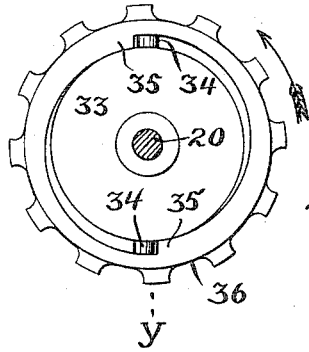
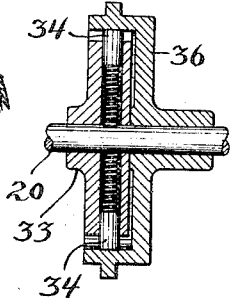
WITNESSES:
J. W. Dickens
Robert Burns.
Augustus Bowser INVENTOR.
BY H. G. Burns
ATTORNEY.

UNITED STATES PATENT OFFICE.

AUGUSTUS BOWSER, OF FORT WAYNE, INDIANA.

APPARATUS FOR HANDLING LIQUIDS.

1,051,365. Specification of Letters Patent. Patented Jan. 21, 1913.

Application filed March 2, 1910. Serial No. 546,904.

*To all whom it may concern:*

Be it known that I, AUGUSTUS BOWSER, a citizen of the United States of America, and resident of Fort Wayne, in the county of Allen and State of Indiana, have invented certain new and useful Improvements in Apparatus for Handling Liquids, of which the following is a specification.

This invention relates to improvements in apparatus for handling liquids, and the object thereof is to provide for the safe distribution in buildings and other places of liquids, especially those that are inflammable or otherwise dangerous, and to effect the distribution under air pressure through piping which leads from a storage tank to the place of discharge, without danger of unintentional flow of liquid.

The object of this invention is accomplished by the construction illustrated in the accompanying drawings in which—

Figure 1. is a vertical sectional view of a building with the invention installed; Fig. 2. is a detail view showing the controlling apparatus partly cut away and in vertical section; Fig. 3. is a transverse section of Fig. 2. on the line X—X; Fig. 4. is a detail showing a clutch used in the apparatus; and Fig. 5. is another view of the clutch, parts being shown in section on the line Y—Y of Fig. 4.

Similar numerals of reference indicate corresponding parts throughout the several views, and referring now to the same: 1 is a building and 2 is the floor thereof.

3 is a pit separated from the building, and 4 is a storage tank for liquid located externally of the building and below the floor level thereof. The bottom of the pit extends below the bottom level of the storage tank, and contains an auxiliary tank 5 that is connected at its lower end with the storage tank 4 by means of a pipe 6. A check valve 7 is arranged in connection with the pipe 6 between the auxiliary and storage tanks and is adapted to prevent back flow of liquid from the former tank into the latter. Hand operated valves 8 and 9 are also arranged in connection with the pipe 6, one on either side of the check valve, and are intended to be closed when the check valve is being repaired and when the apparatus is not being used.

An open vent-pipe 10 leads from the top of the storage tank so as to maintain therein atmospheric pressure, and the storage tank has also a spout 11 through which it is charged with liquid. The auxiliary tank 5 has a discharge pipe 12 leading from its lower end, and extending above the floor level in the building where it connects with the discharge apparatus A, and this discharge pipe has an extension 13 leading to and connecting with a closed expansion tank 14 located above the discharge apparatus. The auxiliary tank becomes filled with liquid from the storage tank by gravital flow, and the liquid received into the auxiliary tank is expelled therefrom by air pressure that is introduced into its upper end through the air pipe 15. The upper end of the air pipe 15 communicates with the controlling valve 16 which is of the two way type of any suitable construction. The valve 16 has in connection therewith a vent pipe 17 and an air supply pipe 18, the latter being connected also with a suitable source of air under pressure as with a tank 19. The valve 16 is operated by its stem 20, which when properly turned, causes air from the tank 19 to enter the auxiliary tank 5 through the pipe 18, valve 16 and pipe 15, and when the stem is returned to its opposite position, the air in the auxiliary tank will become released and discharged through the pipe 15, valve 16 and vent pipe 17. When the air is thus released from the auxiliary tank, the latter becomes refilled with liquid by gravital flow from the storage tank 4. When air is forced into the auxiliary tank, the liquid therein is forced thereby out through the pipe 12 and the air in the expansion tank 14 becomes compressed sufficiently to allow the liquid to rise in the pipe 12 to the level of the discharge apparatus A, but prevents any discharge of liquid except through the discharge apparatus.

The grease cup 21 has connection with the valve 16 through the side port 22 and is for the purpose of lubrication.

The controlling valve 16 and the discharge apparatus proper, for convenience, are contained together within a case 23, and the discharge apparatus proper consists of a cylinder 24 having therein a free plunger 25 which is adapted to be moved therein reciprocally from one end of the cylinder to the other. A three way valve 26 is arranged within the case and has at its opposite sides connections respectively with the corresponding ends 27 and 28 of the cylinder 24 by means of pipes 29 and 30. The valve 26 has also at its top a discharge spout 31, and at its rear end a connection with the pipe 12 which communicates with the lower end of the auxiliary tank 5. The valve 26 is operated by its stem 32, and when turned to one of its positions the liquid in the pipe 12 passes through the valve and enters one end of the cylinder and drives the plunger 25 toward the opposite end of the cylinder which has the effect of expelling the contents of that end of the cylinder out through the valve and discharge spout 31. When the valve is turned to its opposite position, the liquid in the pipe 12 enters the latter end of the cylinder and returns the plunger toward the former end which has the effect of expelling the liquid previously admitted thereinto, out through the valve and discharge pipe 31. When the plunger reaches one end of the cylinder or the other the flow of liquid is thereby stopped until the valve is again turned. Thus, a limited discharge of liquid through the discharge apparatus occurs with each operation of the valve.

Upon the operating valve stem 20 is fixed a clutch 33 having spring pressed lugs 34 which are adapted to engage the abrupt ends of corresponding lugs 35 extending from a toothed wheel 36, the latter being loosely mounted upon the stem 20, so that when the stem is turned in the direction indicated by the arrow the wheel 36 will be likewise turned. When the stem is turned in the opposite direction, the lugs 34 slide upon the tapered sides of the lugs 35 and are thereby pressed inwardly and become ineffective in turning the wheel. Upon the stem 32 of the valve 26 is fixed a toothed wheel 37 of like proportions and in line with the wheel 36, and a sprocket chain 38 connects the two wheels, so that as the one is turned the other will be turned accordingly. In this manner the valve 26 is actuated when the valve stem 20 is turned in the direction of the arrow. Stops 39 and 40 extend from the case 23 so as to engage the handle 41 on the stem 20, and the stops are located respectively so as to allow approximately a half revolution of the handle. The handle is held in lowermost position by means of a retracting spring 42 which winds upon a segment 43 fixed upon the stem 20, when the latter is turned in the direction of the arrow.

In the drawings is shown check controlled apparatus in connection with the discharge apparatus, although such is not essential to the operation of the present invention. The apparatus shown consists of a notched disk 44 fixed upon the stem 32, which is locked by a pawl 45. The pawl is intended to release the disk upon introduction of a check in the way 46, so that the stem may be turned. This feature may be omitted or a substitute mechanism applied without constituting a departure from this invention.

In the operation of this invention, the tank 4 is charged with liquid, and the pipe 18 supplied with air under suitable pressure from any suitable source of supply. The liquid in the tank 4 gravitates through the pipe 6 until the auxiliary tank 5 and pipes 12 and 15 have been filled to the level of liquid in the tank 4, this constituting the normal condition when no liquid is being drawn. When the handle is turned up the valves 16 and 26 are both turned and air from the pipe 18 passes through the valve 16 and pipe 15 into the auxiliary tank and forces its liquid contents out through the pipe 12 on through the valve 26 into one end of the cylinder 24 and drives the plunger toward the opposite end thereof, thus forcing the contents of the cylinder before the plunger out through the valve 26 and discharge spout 31. When the plunger reaches the end of its stroke the flow of liquid ceases, and therefore the quantity of liquid discharged at this operation amounts to no more than that previously contained in the cylinder ahead of the plunger. The handle is then returned to its lowermost position, in which event the valve 16 only is turned, which allows the air previously admitted into the tank 5 to escape through the pipe 15, valve 16 and vent pipe 17. Upon the release of the air from the tank 5, it becomes replenished with liquid from the storage tank as before. When the handle is again turned up, the position of the valve 26 is reversed so the liquid expelled from the tank 5 will enter the end of the cylinder oppositely from that in the previous operation, and the plunger will correspondingly be driven toward its former position, expelling the liquid previously admitted into the cylinder out through the valve 26 and discharge spout 31.

With this apparatus a limited quantity of liquid is discharged upon each complete operation of the handle, and the discharge of larger quantities by accident or carelessness is prevented.

Having described my invention, what I claim as new and desire to secure by Letters Patent, is:

1. In apparatus of the class described, a storage tank; an auxiliary tank having a pipe connection with the former tank, and being adapted to become charged with liquid by gravital flow thereof from the storage tank; a check valve adapted to prevent backflow of liquid between said tanks; a discharge pipe connected at the bottom of the auxiliary tank; an air pipe connected at the top of the auxiliary tank, said discharge and air pipes extending to points respectively above the level of the storage tank; a discharge apparatus connected with the upper part of the discharge pipe for controlling the discharge of liquid therefrom; a valve for alternately applying air under pressure through said air-pipe into the auxiliary tank and releasing the air therefrom; and means in connection with the discharge apparatus and valve for operating the former only when the latter is turned to position for applying air to the auxiliary tank.

2. In apparatus of the class described, a tank adapted to contain liquid; a discharge pipe communicating with the lower part of the tank and extending to a point above the head of liquid therein; a discharge apparatus in connection with the discharge pipe for controlling the discharge of liquid therefrom; and means for alternately applying air pressure within the tank and releasing said pressure, and having connection with the discharge apparatus adapted to actuate the same only when turned to position for applying air to the tank.

3. In apparatus of the class described, a tank adapted to contain liquid; a discharge pipe communicating with the lower part of the tank and extending to a point above the head of liquid in the tank; a discharge apparatus in connection with the discharge pipe including a three-way valve for controlling the discharge therefrom; means having connection with the tank including a two-way valve for alternately applying air pressure within the tank and releasing said pressure; and means in connection with said valves for actuating the three-way valve when the two-way valve is turned to its position for applying pressure to the tank.

4. In apparatus of the class described, a tank adapted to contain liquid; a discharge pipe communicating with the lower part of the tank; a discharge device consisting of a cylinder having a free plunger therein, a discharge spout, and a three-way valve, the latter having constant connection with the discharge pipe and being adapted to alternately afford communication between the respective ends of the cylinder and the discharge spout or discharge pipe accordingly as the said valve is turned; means having connection with the tank including a two-way valve for alternately applying air pressure within the tank and releasing said pressure; and means in connection with said valves for actuating the three-way valve when the two-way valve is turned to its position for applying pressure to the tank.

In testimony whereof I affix my signature, in presence of two witnesses.

AUGUSTUS BOWSER.

Witnesses:
V. M. BURNS,
E. R. HYMAN.